No. 628,172. Patented July 4, 1899.
E. D. WOODS.
POLISHING WHEEL.
(Application filed Oct. 29, 1898.)
(No Model.) 2 Sheets—Sheet 2.
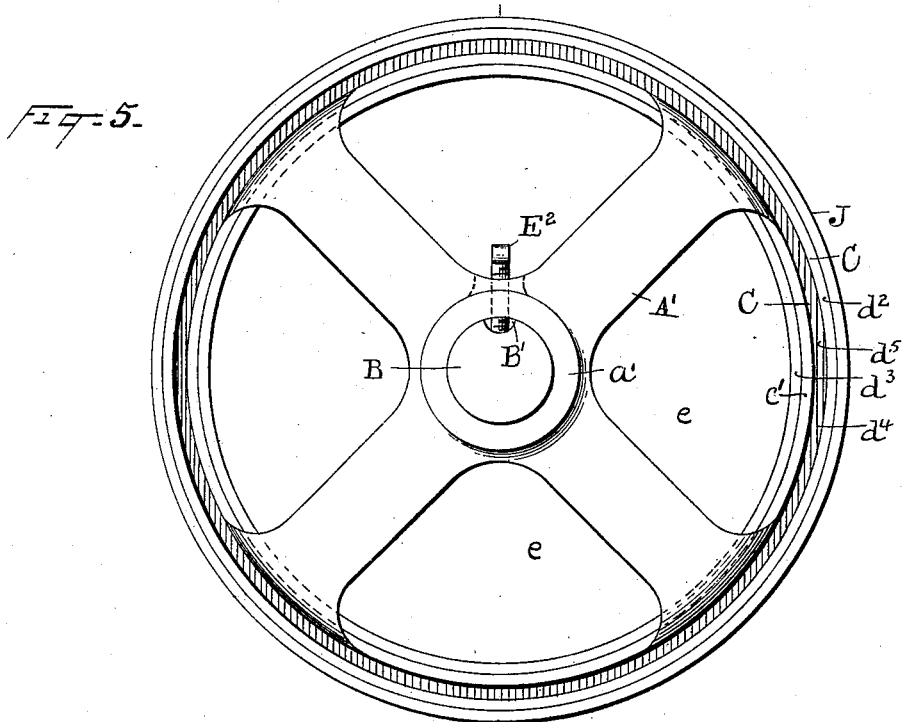
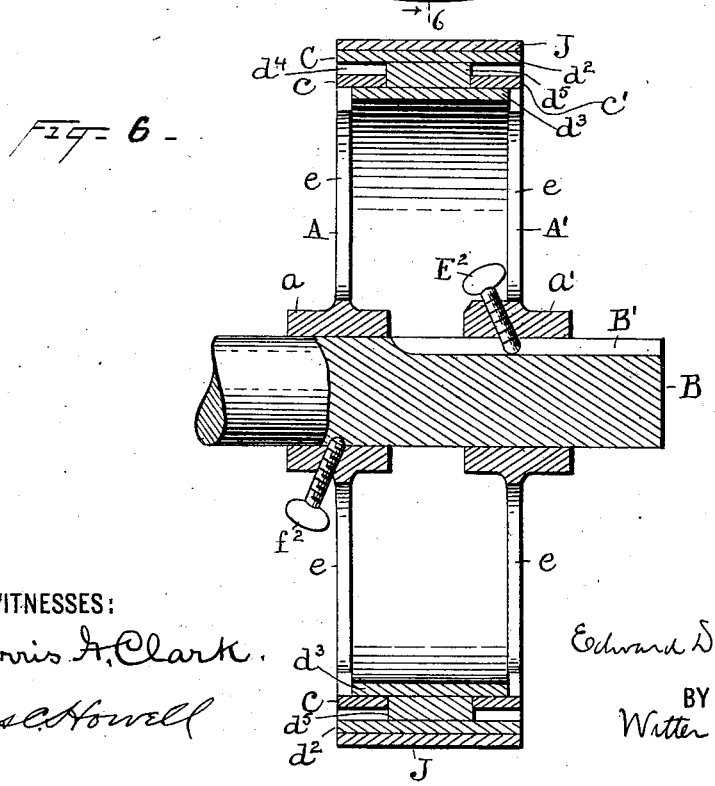
WITNESSES:
Norris A. Clark.
Jas. C. Howell
INVENTOR
Edward Dinsmore Woods
BY
Witter + Kenyon
ATTORNEYS

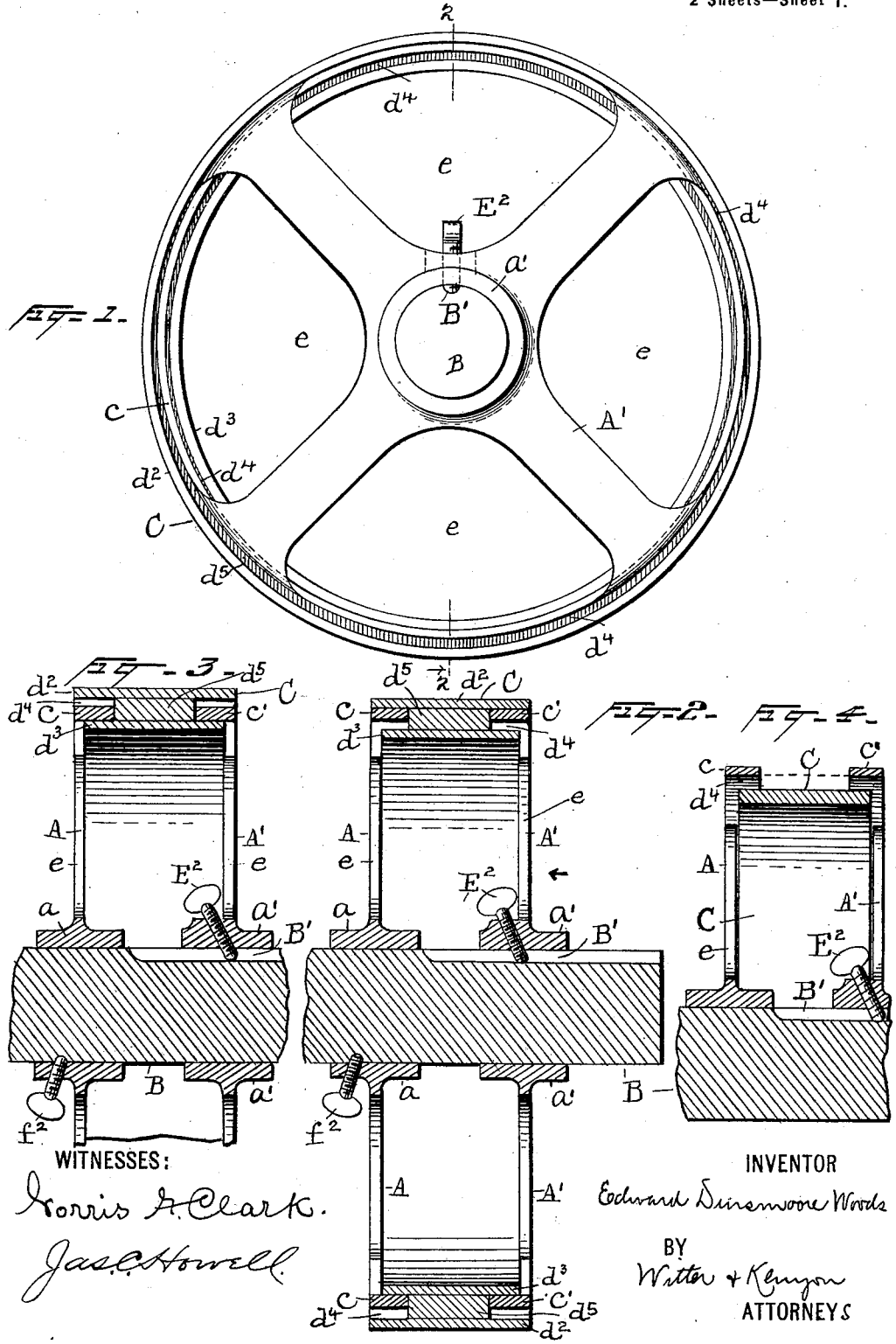

UNITED STATES PATENT OFFICE.

EDWARD DINSMOORE WOODS, OF GRANVILLE, NEW YORK, ASSIGNOR TO THE WOODS SPECIALTY COMPANY, OF NEW YORK.

POLISHING-WHEEL.

SPECIFICATION forming part of Letters Patent No. 628,172, dated July 4, 1899.

Application filed October 29, 1898. Serial No. 694,891. (No model.)

*To all whom it may concern:*

Be it known that I, EDWARD DINSMOORE WOODS, a citizen of the United States, and a resident of Granville, New York, have invented a new and useful Improvement in Polishing-Wheels, of which the following is a specification.

My invention relates to polishing-wheels.

It has for its object to provide a polishing-wheel with a yielding elastic surface adapted for use upon many different kinds of work, simple in construction, with an efficient and durable polishing-surface, and one specially adapted for polishing flat surfaces, and having a polishing-surface whose rigidity depends upon the speed of rotation of the wheel and whose diameter and width can readily be varied.

It consists of the devices herein shown and described.

In the drawings accompanying this specification and forming part hereof, in which similar reference characters in the different figures represent corresponding parts, I have shown and will now proceed to describe the preferred form of my improved device.

Figure 1 is a side view of my improved device viewed as shown by the arrow in Fig. 2. Fig. 2 is a vertical cross-section on the lines 2 2 in Fig. 1 viewed as shown by the arrow, showing the tire in the position it assumes when the wheel is at rest. Fig. 3 is a similar section of the upper part of the wheel, showing the position of the tire when the wheel is rotating; and Fig. 4 is a similar section of the upper part of a modification of my improved wheel. Figs. 5 and 6 are a side elevation of and a central vertical section through my improved wheel, with a removable polishing-band in position thereon in the position assumed by the wheel during rotation.

A A' are the two sides of my improved wheel, and B is the shaft of the same. The side A has a hub $a$ encircling the shaft and by means of screw $f^2$ passing through the hub and into a small depression of shaft B is effectually locked or made fast upon the shaft. As shown, the side A' is removable from the shaft. It is locked in position on the shaft by means of screw $E^2$ passing through the hub $a'$ of side A' into groove B', cut in the surface of the shaft. By turning the screw $E^2$ one way the side A' is left free to move longitudinally on the shaft and may be removed from the same. If it is desired to lock the side A' to the shaft, it is done by turning screw $E^2$ until it firmly grips the floor of groove B'. By this arrangement the side A' may be removed from the wheel or may be placed at any position along the groove B' and be securely locked to the shaft, so as to rotate with it.

C is the tire, the upper surface of which is preferably provided with emery or other suitable substance fitted for polishing purposes. It is preferably made of leather, although it can be made of any suitable material. The preferred form of this tire is shown in Figs. 2 and 3, and consists of three portions—an inner portion $d^3$, an outer portion $d^2$, having a polishing-surface, and a smaller connecting portion $d^5$. These three parts are fastened together by any suitable means—as, for example, by gluing them together—or they may be made integral with one another or of one piece. The above-described arrangement leaves a space $d^4$ at each side of the connecting portion between the outer portion and the inner portion of the tire for a purpose presently to be described.

Each side A A' has a flange $c$ $c'$, which, as shown in Figs. 2 and 3, project into the spaces $d^4$ between the outer and inner portions of the tire. These flanges are retaining-flanges for the tire and act as a stop to limit the outward movement of the tire.

The tire is made to loosely fit the retaining-flanges $c$ $c'$, the space $d^4$ between the inner portion $d^3$ and the outer portion $d^2$ of the tire being slightly greater than the thickness of the retaining-flanges $c$ $c'$. This permits to the tire a slight movement in a radial direction. When the wheel is at rest, the tire drops down into the position shown in Fig. 2. When the wheel is rotating, the centrifugal force throws the tire outward, increasing the diameter of the tire and bringing the outer surface of the inner portion $d^3$ of the tire into contact with the inner surface of the retaining-flanges $c$ $c'$, thus limiting the outward radial movement of the tire and holding it in operative position for polishing. A polishing-surface is thus presented which under the action of centrifugal force as the wheel rotates is yielding and elastic in character and is admirably fitted to act as a polishing-surface, especially for flat metallic surfaces such, for example, as knives. The speed of rotation determines the rigidity of the polishing-surface. The faster the wheel rotates the harder becomes that polishing-surface and the less the speed of the wheel the more yielding and the softer it becomes.

The sides A A' of the wheel preferably have openings e, permitting the atmosphere free access to the under side of the tire, thus assisting the action of the centrifugal force in pressing the tire outward.

The tire of my improved polishing-wheel can readily be taken off and be replaced by another tire by removing the removable side A', and as the side A can be locked to the shaft at any desired point on shaft B tires of any desired width can be used, adapted to different kinds of work.

I prefer the form of tire shown in Figs. 1, 2, and 3; but this form can of course be widely varied without departing from my invention. I have shown, by way of illustration, in Fig. 4 another form of tire. As there shown, the tire consists of but one piece and is arranged entirely inside of the retaining-flanges c c'. The operation of this form of my improved device is, however, the same as that of the form above described. The preferred form of tire shown in Figs. 1, 2, and 3 has the advantage over that shown in Fig. 4 of enabling the workman to polish into corners, which cannot be done with the wheel shown in Fig. 4.

The form and location of the stop for limiting the outward movement of the belt can also be varied from those of the retaining-flanges c c' as long as it acts to limit the outward movement of the belt.

The tire of my improved wheel can itself be used as the polishing-surface by applying emery and glue or other suitable polishing material to the outer face of the tire, or it can be used merely as a support for a removable polishing-band J, as shown in Figs. 5 and 6. In these figures the tire and polishing-band are shown in their outward position, the position assumed by them when the wheel is rotating. Such a removable band is easily placed upon the tire or removed therefrom when the wheel is at rest and through the increase in the diameter of the tire is firmly held in place upon the tire during the rotation of the wheel. Removable bands of different widths, diameter, and character can be employed, as desired.

Although my improved tire and the removable polishing-band are shown in the drawings as having a flat outer surface, they are not limited to this shape, and any other suitable shape may be employed for this or any other part of the tire or band as long as they are not secured to the sides of the wheel and are free to move radially outward when the wheel rotates and are restrained from excessive outward movement by one or more stops e. I prefer, however, the flat polishing-surface shown, as it is better adapted for certain kinds of work.

As both the tire itself and the removable polishing-bands are easily removed and replaced, the wheel is capable of practically continuous use. This is a great gain over the style of polishing-wheels now in use, which are necessarily idle a large part of the time because of the rapid wearing away of the emery or other polishing substance from the wheel and the consequent short life of any polishing-surface and the length of time required for its renewal and for the balancing and truing of the wheel. My improved wheel presents an efficient and durable polishing-surface, one yielding and elastic in character, varying automatically in rigidity with the varying speed of rotation of the wheel, capable of easy adjustment in width and shape, and especially adapted for polishing flat surfaces. It is simple in construction and is adapted for many different kinds of work.

What I claim as new, and desire to secure by Letters Patent, is—

1. In a polishing-wheel a tire capable of movement in a radial direction and adapted to be held in operative position by centrifugal force as the wheel rotates, and a stop for limiting the outward movement of the tire.

2. In a polishing-wheel a tire composed of an outer portion and an inner portion connected together, the inner portion adapted to project inside of a stop and to bear radially outward against the stop when the wheel is rotated, said tire being capable of movement in a radial direction and adapted to be held in operative position by centrifugal force as the wheel rotates, and a stop for limiting the outward movement of the tire.

3. In a polishing-wheel a tire composed of an outer portion, an inner portion and a smaller connecting portion so arranged as to leave a space at each side of the connecting portion between the outer and the inner portions, said tire being capable of movement in a radial direction and adapted to be held in operative position by centrifugal force as the wheel rotates, and retaining-flanges connected with the sides of the wheel and projecting into the spaces between the outer and inner portions of the tire to limit the outward movement of the tire.

4. In a polishing-wheel a tire capable of movement in a radial direction and adapted to be held in operative position by centrifugal force as the wheel rotates, a stop for limiting the outward movement of the tire, and a removable polishing-band adapted to be slipped upon the tire when the wheel is at rest and to be firmly held thereon as the wheel rotates.

5. In a polishing-wheel a tire composed of an outer portion and an inner portion connected together, the inner portion adapted to project inside of a stop and to bear radially outward against the stop when the wheel is rotated, said tire being capable of movement in a radial direction and adapted to be held in operative position by centrifugal force as the wheel rotates, a stop for limiting the outward movement of the tire, and a removable polishing-band adapted to be slipped upon the tire when the wheel is at rest, and to be firmly held thereon as the wheel rotates.

6. In a polishing-wheel a tire composed of an outer portion, an inner portion and a smaller connecting portion so arranged as to leave a space at each side of the connecting portion between the outer and the inner portions, said tire being capable of movement in a radial direction and adapted to be held in operative position by centrifugal force as the wheel rotates, retaining-flanges connected with the sides of the wheel and projecting into the spaces between the outer and inner portions of the tire to limit the outward movement of the tire, and a removable polishing-band adapted to be slipped upon the tire when the wheel is at rest and to be firmly held thereon as the wheel rotates.

7. In a polishing-wheel a removable side, means for locking the side in position, a tire capable of movement in a radial direction and adapted to be held in operative position by centrifugal force as the wheel rotates, and a stop for limiting the outward movement of the tire.

8. In a polishing-wheel a removable side, means for locking the side in position, a tire composed of an outer portion, an inner portion and a smaller connecting portion, so arranged as to leave a space at each side of the connecting portion between the outer and the inner portions, said tire being capable of movement in a radial direction and adapted to be held in operative position by centrifugal force as the wheel rotates, and a retaining-flange on each side of the wheel projecting into the space between the outer and inner portions of the tire to limit the outward movement of the tire.

9. In a polishing-wheel, a removable side, a groove in the shaft of the wheel, a screw-threaded pin projecting from the hub of the said removable side into said groove, whereby the said side may be locked to the shaft in any desired position along the groove and be caused to rotate with the shaft, a tire capable of movement in a radial direction and adapted to be held in operative position by centrifugal force as the wheel rotates, and a stop for limiting the outward movement of the tire.

10. In a polishing-wheel, a removable side, a groove in the shaft of the wheel, a screw-threaded pin projecting from the hub of the said removable side into said groove, whereby the said side may be locked to the shaft in any desired position along the groove and be caused to rotate with the shaft, a tire capable of movement in a radial direction and adapted to be held in operative position by centrifugal force as the wheel rotates, composed of an outer portion, an inner portion and a smaller connecting portion, so arranged as to leave a space at each side of the connecting portion between the outer and the inner portions, said tire being capable of movement in a radial direction and adapted to be held in operative position by centrifugal force as the wheel rotates, and a retaining-flange on each side of the wheel projecting into the space between the outer and inner portions of the tire to limit the outward movement of the tire.

In testimony whereof I have signed my name to this specification in the presence of two subscribing witnesses.

EDWARD DINSMOORE WOODS.

Witnesses:
    EDWIN SEDGER,
    SIDNEY MANN.